(12) United States Patent
Chevalier et al.

(10) Patent No.: US 11,230,218 B2
(45) Date of Patent: Jan. 25, 2022

(54) SLIDE OUT KITCHEN

(71) Applicant: Dometic Sweden AB, Solna (SE)

(72) Inventors: Nicolas Christophe Gilles Chevalier, Camberwell (AU); Samuele Meda, Solna (SE); Joakim Ahlström, Täby (SE); Jason Svarc, Victoria (AU); Jean Paul Louis Ramirez, Serignan (FR)

(73) Assignee: Dometic Sweden AB, Solna (SE)

( * ) Notice: Subject to any disclaimer, the term of this patent is extended or adjusted under 35 U.S.C. 154(b) by 68 days.

(21) Appl. No.: 16/624,153

(22) PCT Filed: Jun. 19, 2018

(86) PCT No.: PCT/IB2018/054484
§ 371 (c)(1),
(2) Date: Dec. 18, 2019

(87) PCT Pub. No.: WO2018/234979
PCT Pub. Date: Dec. 27, 2018

(65) Prior Publication Data
US 2020/0171996 A1    Jun. 4, 2020

(30) Foreign Application Priority Data

Jun. 20, 2017 (AU) .............................. 2017902347

(51) Int. Cl.
*B60P 3/36* (2006.01)
*B60P 3/34* (2006.01)

(52) U.S. Cl.
CPC .. *B60P 3/36* (2013.01); *B60P 3/34* (2013.01)

(58) Field of Classification Search
CPC .......... F24B 1/202; F24B 1/205; F24C 15/16; B60P 3/36; B60P 3/34; B60P 3/0612; B60P 3/00
USPC .......... 126/332, 333, 339; 296/190.1, 190.08
See application file for complete search history.

(56) References Cited

U.S. PATENT DOCUMENTS

| 2,180,459 | A |   | 11/1939 | Earle |
| 2,867,471 | A | * | 1/1959  | Coon, Jr. .................. B60P 3/36 296/156 |
| 2,907,316 | A |   | 10/1959 | Windust |
| D191,250  | S |   | 8/1961  | Pappas |

(Continued)

FOREIGN PATENT DOCUMENTS

| AU | 201713974 | 7/2017 |
| AU | 201713975 | 7/2017 |

(Continued)

OTHER PUBLICATIONS

European Patent Office, International Search Report and Written Opinion for PCT/IB2018/054484 dated Oct. 12, 2018, 10 pages.

(Continued)

*Primary Examiner* — D Glenn Dayoan
*Assistant Examiner* — Kevin P Weldon
(74) *Attorney, Agent, or Firm* — Middleton Reutlinger

(57) ABSTRACT

A slide out kitchen for a vehicle is provided. The slide out kitchen includes an elongate cabinet adapted for moveable, mounting between a closed configuration and an extended configuration. At least one cooktop and an accessory engagement structure to secure kitchen accessories to the cabinet, are also provided.

21 Claims, 10 Drawing Sheets

(56) References Cited

U.S. PATENT DOCUMENTS

| | | | |
|---|---|---|---|
| 3,174,815 A * | 3/1965 | Drew | F16B 12/44 |
| | | | 312/263 |
| 3,472,219 A | 10/1969 | Roy et al. | |
| 3,692,351 A * | 9/1972 | Christopher | A47J 37/00 |
| | | | 296/156 |
| 5,263,467 A * | 11/1993 | Jones | A47J 37/0713 |
| | | | 126/37 B |
| 5,586,546 A * | 12/1996 | Ashcraft | B60P 3/36 |
| | | | 126/37 B |
| 6,098,346 A | 8/2000 | Miller et al. | |
| 6,213,575 B1 | 4/2001 | Brin, Jr. et al. | |
| 6,254,160 B1 * | 7/2001 | Marriott | B60N 2/206 |
| | | | 296/24.3 |
| 6,334,684 B1 | 1/2002 | Yoshida et al. | |
| 6,349,715 B1 | 2/2002 | McBroom | |
| D472,756 S | 4/2003 | Pai | |
| 6,647,978 B1 | 11/2003 | Khosropour et al. | |
| 6,655,374 B1 * | 12/2003 | Beller | A47J 37/0713 |
| | | | 126/305 |
| 6,725,855 B1 * | 4/2004 | Brennan | A47J 37/0763 |
| | | | 126/276 |
| 6,792,936 B2 | 9/2004 | Wagner | A47J 37/0786 |
| | | | 126/25 R |
| 6,814,383 B2 * | 11/2004 | Reed, III | B60P 3/0257 |
| | | | 224/404 |
| D516,856 S | 3/2006 | Langhannnner et al. | |
| D548,515 S | 8/2007 | Thygesen et al. | |
| D560,420 S | 1/2008 | Roth | |
| D578,349 S | 10/2008 | Rieser | |
| D609,960 S | 2/2010 | Cutino | |
| 8,231,036 B2 * | 7/2012 | Campbell | B60R 9/065 |
| | | | 224/527 |
| 9,726,380 B2 | 8/2017 | Reischmann | |
| 10,065,278 B2 | 9/2018 | Jonovic et al. | |
| D870,505 S | 12/2019 | Chevalier et al. | |
| D871,824 S | 1/2020 | Chevalier et al. | |
| 2004/0026946 A1 | 2/2004 | Reed, III et al. | |
| 2008/0245242 A1 | 10/2008 | Birdsall | |
| 2009/0108718 A1 | 4/2009 | Craig et al. | |
| 2009/0165771 A1 * | 7/2009 | Selk | A47J 37/0781 |
| | | | 126/25 R |
| 2013/0113343 A1 | 5/2013 | Singlak et al. | |
| 2015/0047198 A1 * | 2/2015 | Bruin-Slot | F24F 13/0254 |
| | | | 29/897.3 |
| 2015/0201805 A1 * | 7/2015 | Cedar | F23B 20/00 |
| | | | 126/25 R |
| 2017/0290454 A1 | 10/2017 | Hall et al. | |

FOREIGN PATENT DOCUMENTS

| | | | | |
|---|---|---|---|---|
| CN | 105035327 A | | 11/2015 | |
| CN | 206166282 U | | 5/2017 | |
| DE | 8611375 | | 8/1987 | |
| DE | 10357306 | | 7/2005 | |
| EP | 3019060 | | 5/2016 | |
| FR | 2535265 | | 5/1984 | |
| GB | 2244959 A | * | 12/1991 | ............... B60P 3/34 |
| JP | 2006026251 A | | 2/2006 | |
| KR | 200464129 Y1 | * | 12/2012 | |
| WO | 2015006549 A1 | | 1/2015 | |
| WO | 2018/234979 A1 | | 12/2018 | |

OTHER PUBLICATIONS

Australian Application No. 2017902347 filed Jun. 20, 2017.
SIPO, First Notification to Make Rectifications for Chinese Patent Application No. 201730679137.9 dated May 25, 2018.
Non-Final Office Action issued in U.S. Appl. No. 29/631,233 dated Dec. 27, 2018.
Non-Final Office Action issued in U.S. Appl. No. 29/631,234 dated Dec. 27, 2018.
Notice of Allowance issued in U.S. Appl. No. 29/631,233 dated May 23, 2019.
Notice of Allowance issued in U.S. Appl. No. 29/631,234 dated May 28, 2019.
Notice of Allowance issued in U.S. Appl. No. 29/631,233 dated Aug. 13, 2019.
Notice of Allowance issued in U.S. Appl. No. 29/631,234 dated Aug. 28, 2019.
Transmittal Letter of Related Cases dated Oct. 4, 2018.
Chinese Patent Application No. 201730679137.9 entitled "Slide Out Kitchen" filed Dec. 28, 2017.
AU Patent Application No. 2018288433 entitled "Slide Out Kitchen" filed Jan. 13, 2020.
Chinese Patent Application No. 201730678291.4 entitled "Slide Out Kitchen" filed Dec. 28, 2017.
SIPO, First Notification to Make Rectifications for Chinese Patent Application No. 201730678291.4 dated May 23, 2018.
European Design Patent Application No. 004554194 filed Dec. 17, 2017.
EUIPO, Notification of registration of Community Design No. 001463533-0001 dated Jan. 31, 2018.
EUIPO, Notification of registration of Community Design No. 001463558-0001 dated Jan. 31, 2018.
EUIPO, Notification of registration of Community Design No. 001463566-0001 dated Jan. 31, 2018.
EUIPO, Notification of registration of Community Design No. 001463574-0001 dated Jan. 31, 2018.
EUIPO, Notification of registration of Community Design No. 001463582-0001 dated Jan. 31, 2018.
EUIPO, Notification of registration of Community Design No. 001463590-0001 dated Jan. 31, 2018.
EUIPO, Notification of registration of Community Design No. 001463608-0001 and 001463609-0002 dated Jan. 31, 2018.
Office Action Issued for CN Patent Application No. 2018800409734 dated Aug. 4, 2021.

* cited by examiner

SLIDE OUT KITCHEN

FIELD OF INVENTION

The present embodiments relates to slide out kitchens.

The embodiments have been developed primarily for use as a slide out kitchen for use in a vehicle and will be described hereinafter with reference to this application. However, it will be appreciated that the teaching is not limited to this particular field of use.

BACKGROUND

The following discussion of the prior art is intended to place the invention in an appropriate technical context and enable the associated advantages to be fully understood. However, any discussion of the prior art throughout the specification should not be considered as an admission that such art is widely known or forms part of the common general knowledge in the field.

Driven and towed recreational vehicles such as campervans often employ exterior mounted and retractable cabinets for storage purposes. Increasingly, however, these cabinets are being used to house kitchen components to make preparation of meals more convenient during travel or during camping. These retractable cabinets housing the kitchen components are generally known as slide out kitchens. The kitchen components typically include sinks with taps connected to stored water supplies, gas driven cooktop burners and food preparation areas. In some cases, slide out kitchens are known to include compact refrigerators and barbeques.

Slide out kitchens are also known to be used in the outdoor areas of housing structures such as balconies and/or outdoor alfresco areas, to provide an outdoor kitchen that can be packed away when not in use.

The majority of known slide out kitchens are fabricated from stainless steel sheets that are bent to form the cabinet shape. However, a problem with stainless steel construction is that it makes the slide out kitchen relatively heavy. In this regard, for the sake of robustness, stainless steel sheet is normally at least 1 mm thick, which when the kitchen components are added results in slide out kitchens with weights up to 75 kgs.

This excessive weight is problematic in most slide out kitchen applications. In a vehicle mounted application, a heavy slide out kitchen can affect the vehicle's stability, place undue stress on the towing vehicle's attachment means such as a tow ball and increase the towing vehicle's fuel consumption. In a house mounted application, having an excessively heavy slide out kitchen results in a high momentum load, which makes the slide out kitchen difficult to extend and retract.

Stainless steel construction also does not resist the corrosive environments common to outdoor use and recreational vehicles use such as ocean road driving and camping. As a result, corrosion is a concern in the absence of regular cleaning.

Slide out kitchens are also known to be fabricated from fibreglass. However, fabricating from fibreglass does not offer much design flexibility in design. Fibreglass slide out kitchens are also relatively time consuming to build and therefore expensive to manufacture.

Other than construction material, another known problem with existing slide out kitchens is the absence of space for securing items associated with kitchen use such as cups and kitchen utensils. Placement of these items on the flat food preparation area is not secure and can result in these items falling to the ground during use.

A further known problem with slide out kitchens is that wind gusts can affect cooktop use, whereby cooking flames are affected. For this reason, many slide out kitchens have removable sidewalls surrounding the cooktop to provide wind protection. However, this solution is cumbersome, requires installation and further adds to the kitchen weight.

Vehicle mounted slide out kitchens are typically mounted on the driven or towed vehicle's floor. The floor height may vary between 600 mm to 1200 mm from the ground. As are result, a further problem with slide out kitchens is that the height of the cooking surface may be too high or too low to be comfortable for a user.

The present embodiments overcome or ameliorate at least one of the disadvantages of the prior art, or to provide a useful alternative.

The present embodiments in at least one form provide a slide out kitchen that is relatively lighter than prior art kitchens as well as not being affected by use in corrosive environments. The slide out kitchen is easier to use, protects from wind gusts and has an area to securely locate the commonly used items. The present invention provides a slide out kitchen that has an adjustable working surface height.

SUMMARY

According to some embodiments, there is provided a slide out kitchen including:
  an elongate cabinet adapted for moveable mounting to a structure between a closed configuration and an extended configuration;
  at least one cooktop; and
  an accessory engagement means for securing kitchen accessories to the cabinet.

In one embodiment, the cabinet includes an elongate top panel, a pair of elongate side panels and at least one end panel.

In one embodiment, the cabinet includes at least one corner support.

In one embodiment the elongate top panel, pair of elongate side panels and at least one corner support are selected from a set of panels and supports having predefined lengths.

In one embodiment, one of the elongate sides and the elongate top panel are engaged with the at least one corner support.

In one embodiment, the at least one corner support includes a pair of grooves for receiving one of the elongate sides and the elongate top panel.

In one embodiment, the cabinet is formed from extruded aluminium members and aluminium composite panels.

In one embodiment, the elongate top panel, pair of elongate side panels and at least one end panel are aluminium composite panels.

In one embodiment, the at least one corner support is an aluminium extruded profile.

In one embodiment, the accessory engagement means includes at least one elongate slot.

In one embodiment, the at least one elongate slot is located adjacent one of the elongate sides of the cabinet.

In one embodiment, the slot is disposed in the at least one corner support.

In one embodiment, the at least one elongate slot is adapted for engagement with one or more accessory brackets, the brackets having a slot engaging portion with a complementary profile to the at least one elongate slot.

In one embodiment, the slide out kitchen further includes one or more interchangeable kitchen components adapted for predefined locational engagement with the elongate top panel.

In one embodiment, the one or more interchangeable kitchen components include a chopping board, a barbeque lid, cast iron grille tray and a preparation tray.

In one embodiment, the slide out kitchen further includes a sink.

In one embodiment, the cooktop is recessed into the elongate top panel such that during use, flames from the cooktop are minimally affected by wind gusts.

In one embodiment, the sink is recessed into the elongate top panel.

In one embodiment, the cabinet is adapted for moveable mounting to the structure using a pair of telescoping rails.

In one embodiment, the cabinet is removable from the structure.

In one embodiment, the slide out kitchen further includes a retractable rolling platform for supporting the cabinet once removed from the structure.

In one embodiment, the slide out kitchen further includes at least one storage drawer extending from one of the elongate sides.

In one embodiment, upon reaching the closed configuration the at least one end is substantially flush with a side of the structure.

In one embodiment, self-clinching nuts are used to secure the slide out kitchen to the structure.

In one embodiment, the structure is part of a vehicle.

According to a further aspect, a method of installing the slide out kitchen is described above to a vehicle, the method including the steps of:

(i) placing a template indicating the mounting holes for the slide out kitchen on the surface to be mounted within the vehicle;

(ii) drilling the mounting holes;

(iii) placing the slide out kitchen in position on the surface to align with the drilled holes; and (iv) securing the kitchen to the surface by placing screw fastener through each the drilled hole and the slide out kitchen, wherein self-clinching nuts are placed on each screw fastener to secure the slide out kitchen to the surface.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF DRAWINGS

Various embodiments will now be described, by way of example only, with reference to the accompanying drawings in which.

DETAILED DESCRIPTION

Figure 1:
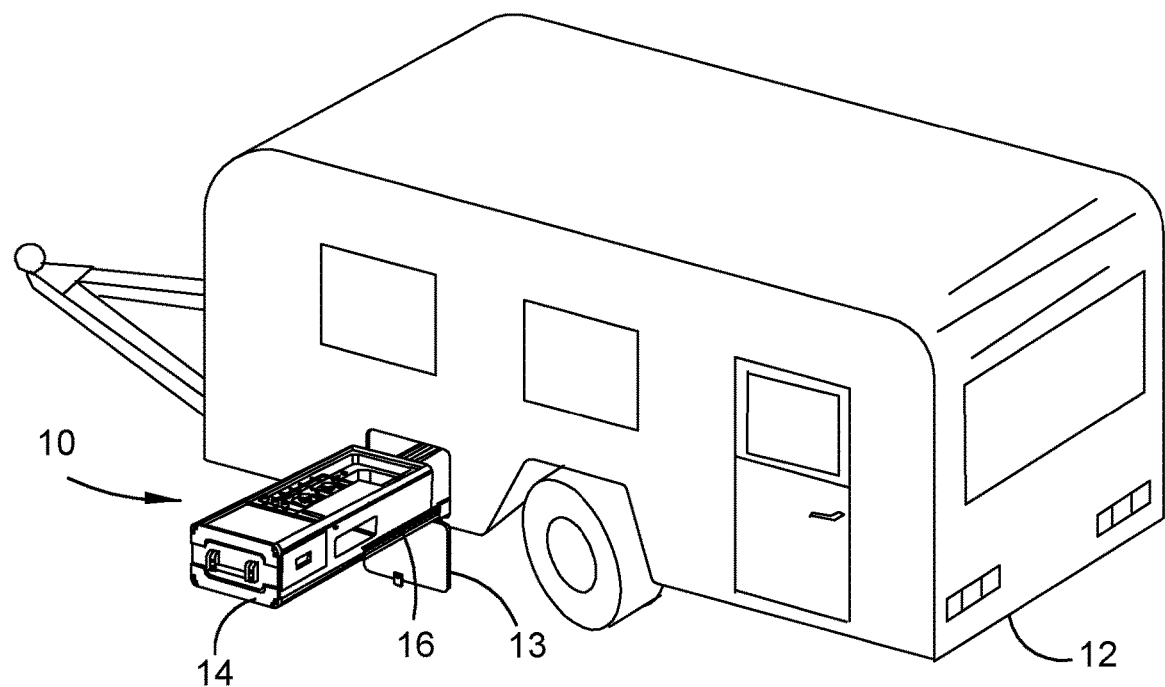
FIG. 1 is a perspective view of a slide out kitchen in accordance with a first embodiment, shown in an extended configuration and installed in a recreational vehicle.

Exemplary embodiments will now be described in detail with reference to the accompanying drawings. In the drawings, the same elements are denoted by the same reference numerals throughout. In the following description, detailed descriptions of known functions and configurations incorporated herein have been omitted for conciseness and clarity.

Figure 2:
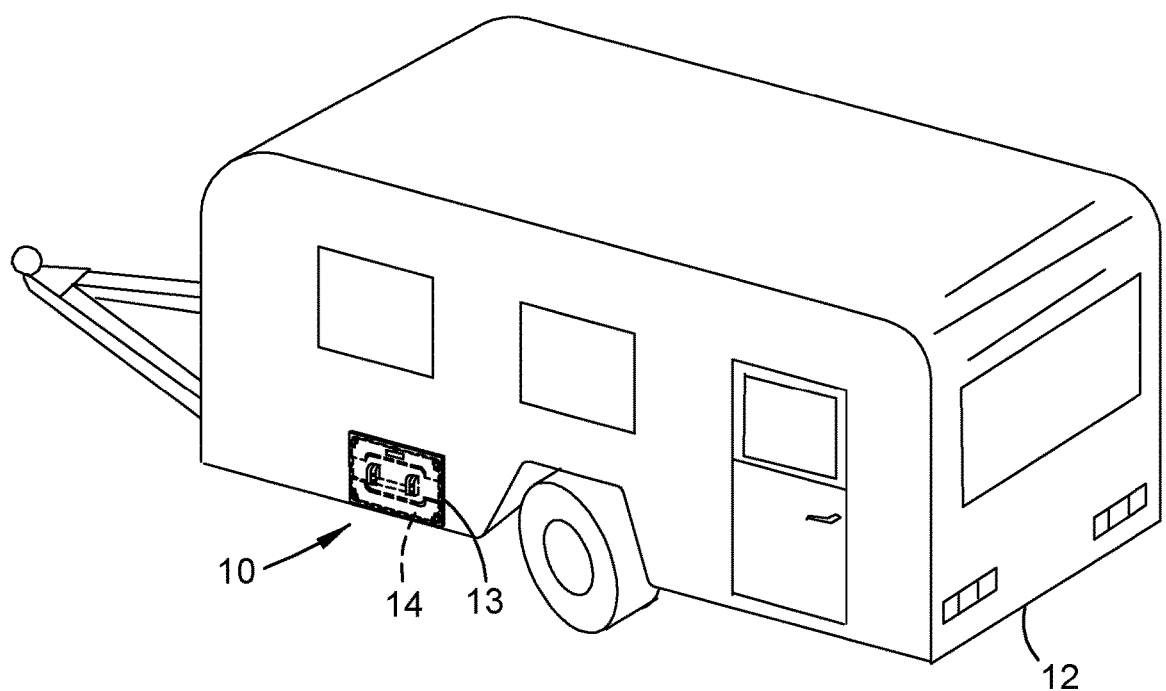
FIG. 2 is a perspective view of the slide out kitchen of FIG. 1 shown in a closed configuration.

Referring to the accompanying drawings and initially to FIGS. 1 and 2, there is provided a slide out kitchen 10. The slide out kitchen is mountable in a structure, which in the illustrated embodiment, is a recreational vehicle 12. Vehicle 12 is a caravan and the kitchen 10 is used to supplement the internal kitchen provided inside the caravan.

The slide out kitchen may also be installed in other vehicles such as self-propelled or towed vehicles, with or without an internal kitchen. Alternatively, the slide out kitchen can be installed in a structure such as the outdoor area of a house to supplement the main kitchen. In one application, the slide out kitchen is installed in a balcony area or alfresco area of a house. In a further application, the slide out kitchen may be installed in an off-road utility vehicle. In yet a further application, the slide out kitchen may be installed in a floating vehicle such as a boat or yacht.

Referring back to FIGS. 1 and 2, kitchen 10 includes an elongate cabinet 14 adapted for moveable mounting to a structure. In the illustrated embodiment, the structure is a vehicle 12 and will be described hereinafter in that context, however, the invention is not necessarily limited to this application.

The cabinet moves between an extended configuration shown in FIG. 1, wherein the cabinet extends out the side of the vehicle, and a closed configuration recessed into the side the vehicle behind hinged access door 13, shown in FIG. 2. It is proposed that when the cabinet is in the closed configuration, the end of the cabinet is generally flush with the vehicle side behind the access door 13. As described in more detail below, the cabinet is slidably mounted to the vehicle using heavy duty and telescopically acting drawer slides 16.

Figure 3:
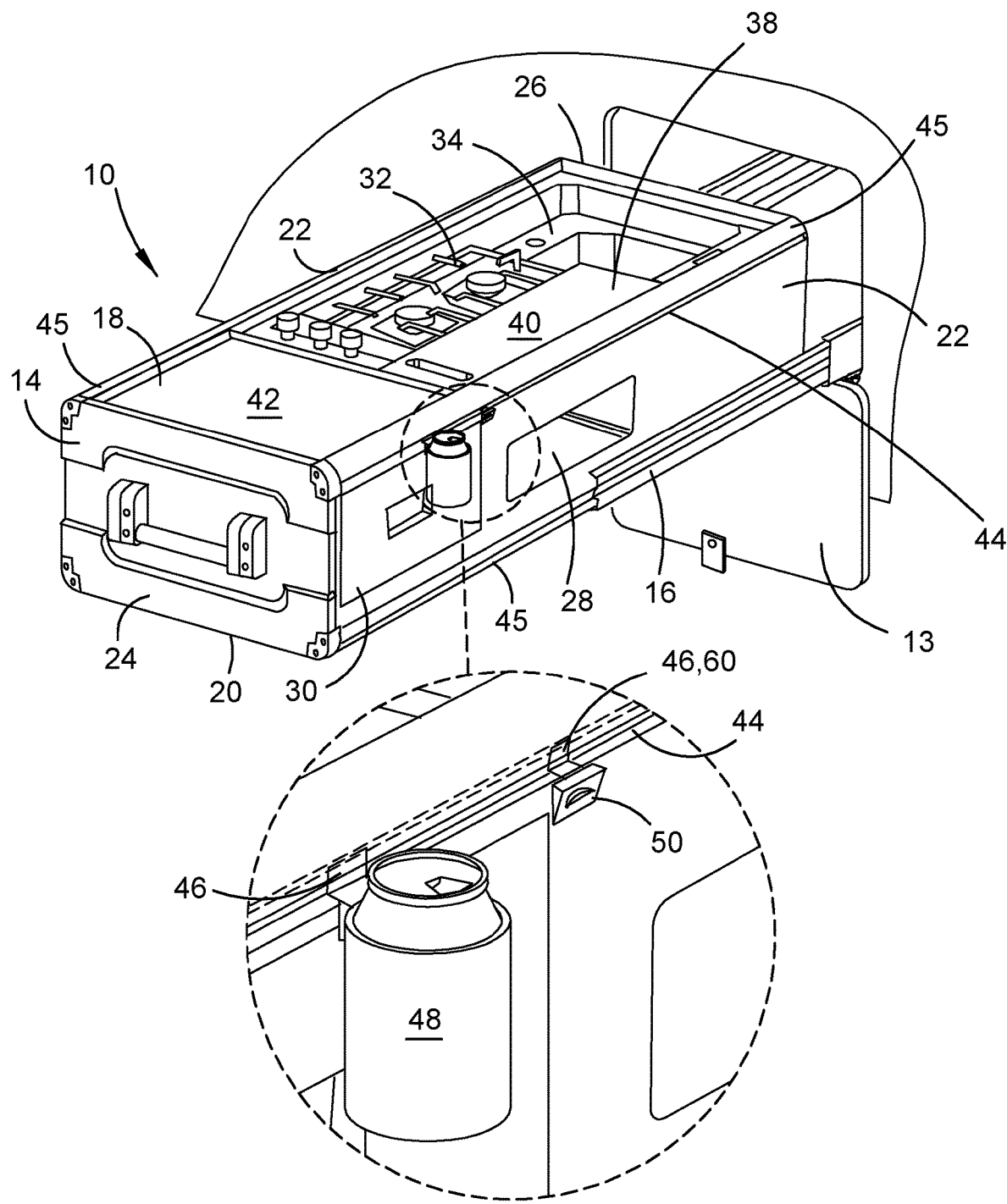
FIG. 3 is an enlarged perspective view of the slide out kitchen of FIG. 1 showing an accessory engagement means.

Referring now to FIG. 3, cabinet 14 includes an elongate top surface 18, an elongate bottom surface 20, a pair of elongate sides 22, outer end 24 and inner end 26. In the illustrated embodiment, a storage area 28 and pull out pantry drawer 30 are further provided for storage use as required.

A cooktop 32, sink 34 and optional tap 36 (not shown), are provided and are accessible from the top surface 18. Both the cooktop and sink are substantially recessed into the top surface in order minimise the effect of wind blowing out cooktop flames and to better locate pots and pans in position during the cooking process.

One or more interchangeable kitchen components 38 are provided for predefined locational engagement with the elongate top surface 18. In the illustrated embodiment, the interchangeable components include a chopping board 40 and serving tray 42. These components are removable from the cabinet when required to expose the top surface 18. Alternatively, these components may be replaced with other kitchen components as required.

In accordance with some embodiments, the slide out kitchen 10 further includes an accessory engagement means in the form of an elongate slot 44 located on the cabinet 14. In the illustrated embodiment, the slot is disposed in one of the corner supports 45, which is used to connect the top surface and one of the elongate sides. However, the slot 44 may be positioned in any location on the cabinet 14 and, in some embodiments, multiple slots may be provided in various locations. As shown, slot 44 is used in combination with accessory brackets 46 for securing kitchen accessories to the cabinet. These accessories may include a beverage holder 48, a bottle opener 50 as shown, a bin support frame, general hooks, utensil/condiment containers or any variety of items which are common used during cooking.

Figure 4A:
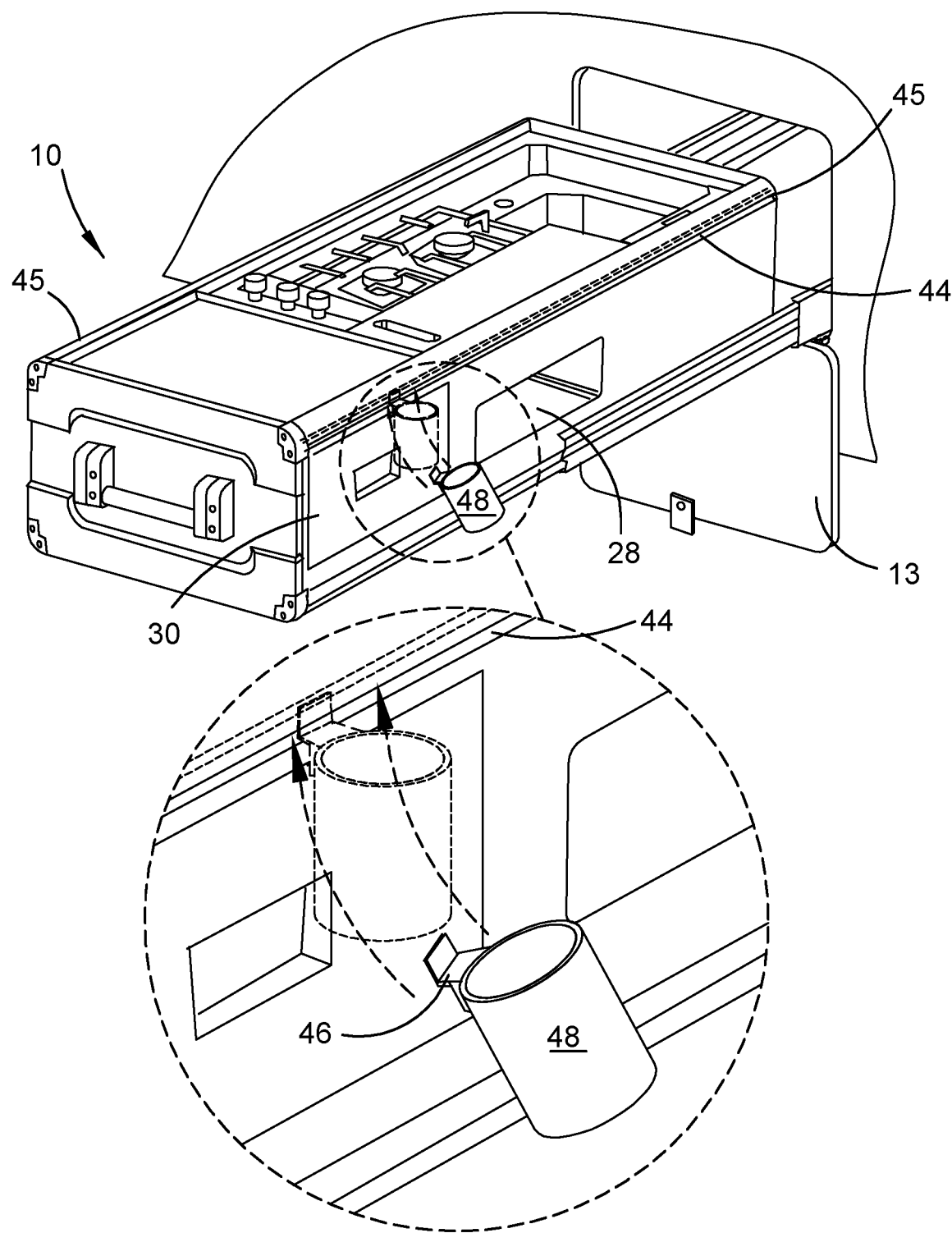
FIG. 4a is a perspective view and an enlarged perspective of the slide out kitchen of FIG. 1, showing accessories bracket being engaged to the attachment means.
Figure 4B:
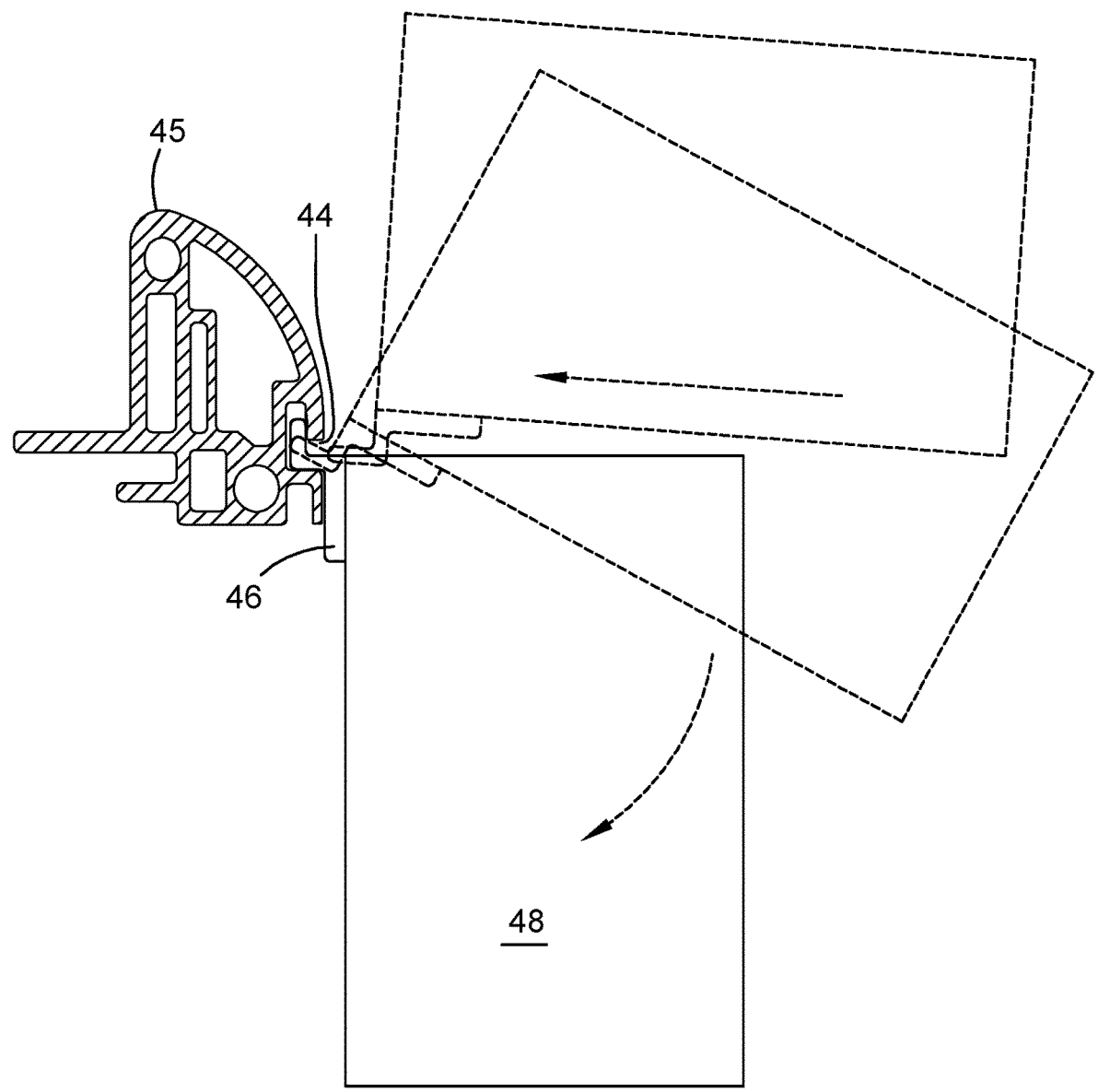
FIG. 4b is an enlarged schematic side view of part of the slide out kitchen of FIG. 1, showing an accessory bracket being engaged to the attachment means.

Slot 44 is configured for engagement with the accessory bracket 46, which has a complementary slot engaging profile. More specifically and as best shown in FIGS. 4a and 4b, the accessory bracket 46 is engaged with the slot by simply pushing the slot engaging profile into the slot 44 and allowing it to rotate downwardly, thereby using gravity and surface friction to retain the bracket in position. This is most clearly demonstrated with reference to FIG. 4b. Advantageously, once engaged, a user can slide the bracket longitudinally along the slot to the desired position. In further not shown embodiments, slot 44 may include teeth formations which engage with corresponding teeth formations in the bracket 46 to thereby lock the bracket in position without risk of sliding. Advantageously, even using teeth formations, the bracket may be easily moved along the slot by tilting the bracket upwardly and disengaging the corresponding teeth formations prior to longitudinally moving the bracket along the slot 44. Alternatively, the slot 44 may be used for other alternative purposes such as engagement with custom accessories developed by third party suppliers or home users.

Figure 5:
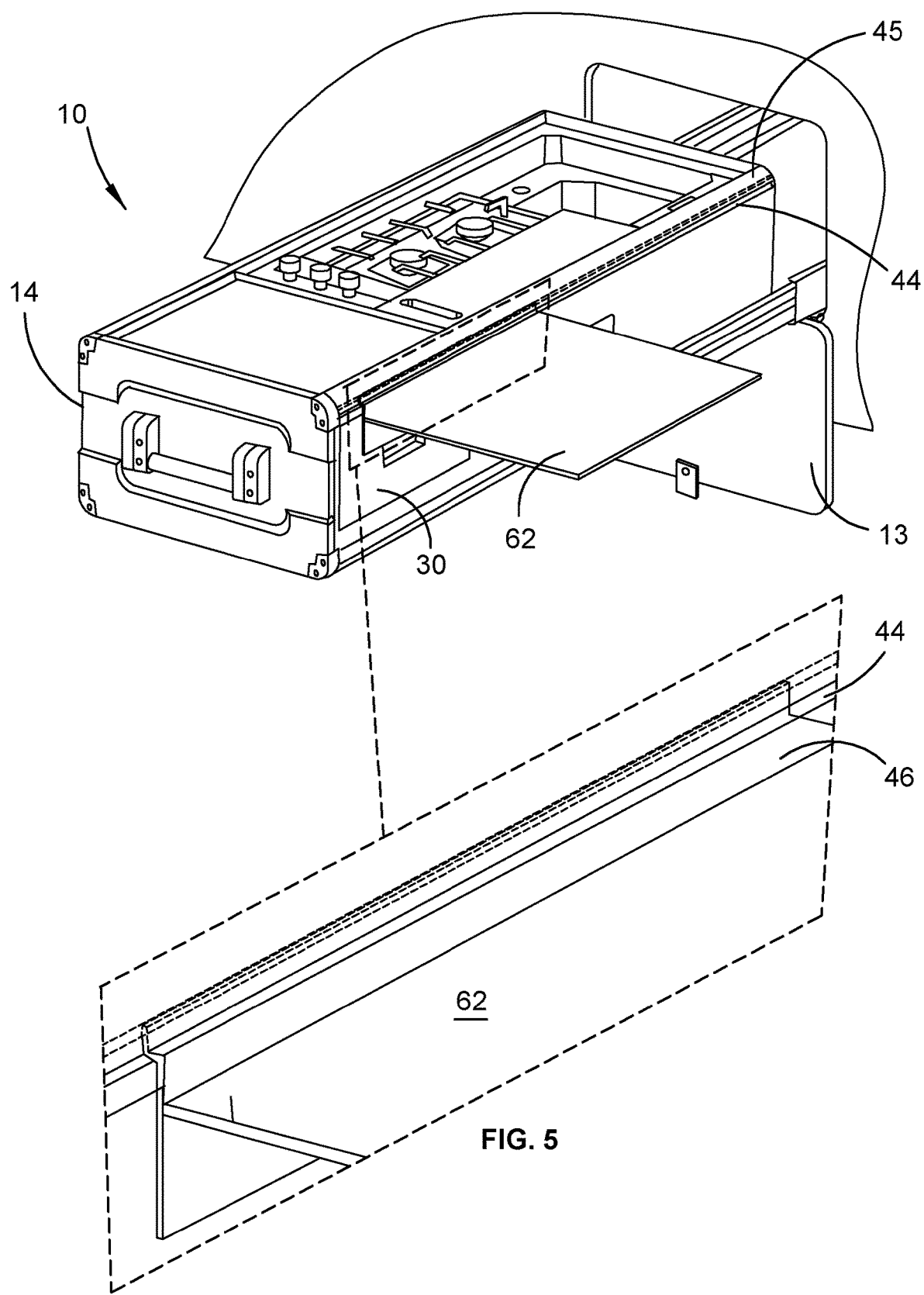
FIG. 5 is an enlarged perspective view of a slide out kitchen of FIG. 1, showing a supplementary table being attached to the side of the slide out kitchen.

With reference to FIG. 5, in one application, the accessory bracket may be part of a supplementary table 62, which is engaged with the slot using the aforementioned process of FIG. 4b. In this way, the bench space available can be significantly extended. Advantageously, such accessories can be stored in drawer 30 or storage area 28 while the cabinet is in the closed configuration.

Figure 6A:
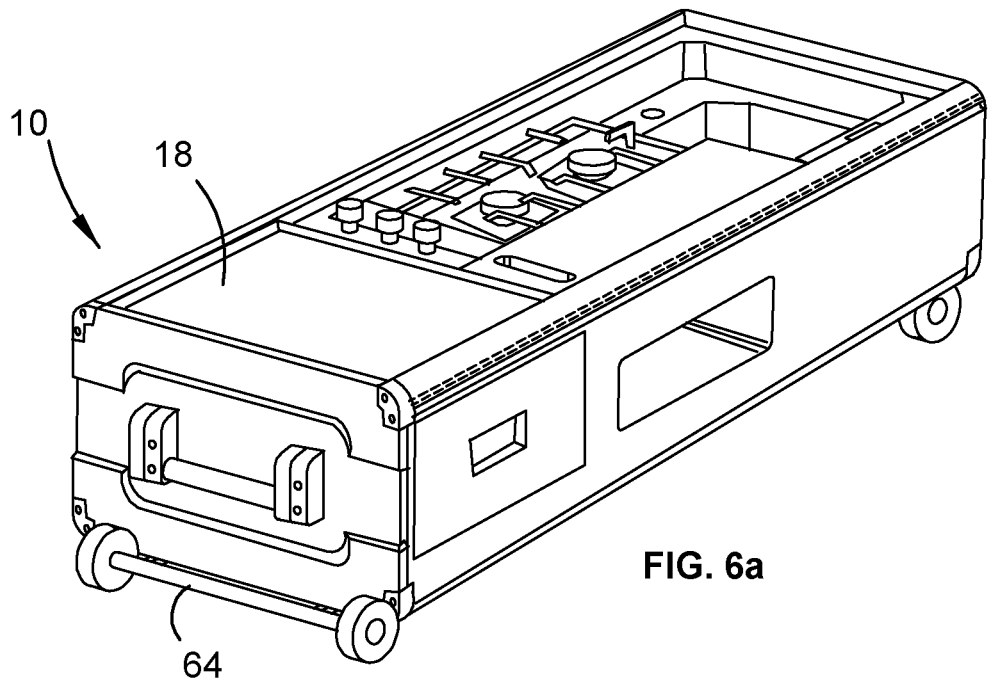
FIG. 6a is a perspective view of a slide out kitchen in accordance with a second embodiment with trolley legs contracted.
Figure 6B:
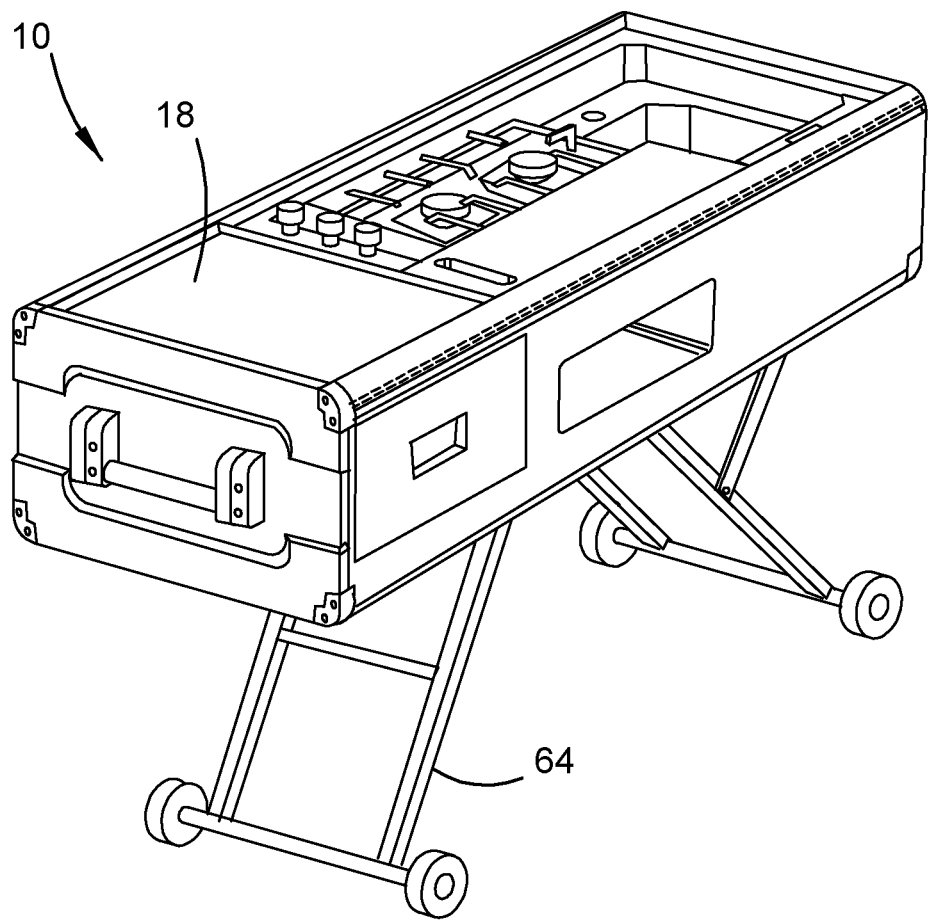
FIG. 6b is a perspective view of a slide out kitchen of FIG. 6a with the trolley legs extended.

With reference to FIGS. 6a and 6b, in accordance with a further embodiment, slide out kitchen of the present invention is provided with a means to adjust its height. In this application, the slide out kitchen 10 is removable from the vehicle and transportable using collapsible and spring-loaded trolley legs 64. Using the trolley legs, the kitchen is moveable to a position as required and potentially closer to a camp site, Further, it should be noted that using trolley legs 64, a selectable ideal working height for the top surface 18 is provided.

In this embodiment, the collapsible trolley legs move between a storage configuration while inside the vehicle as shown in FIG. 6a, to an open configuration as shown in FIG. 6b, outside the vehicle. This change in configuration may be clearly understood with reference to sectional diagrams depicted in FIGS. 7a to 7c.

Figure 7A:
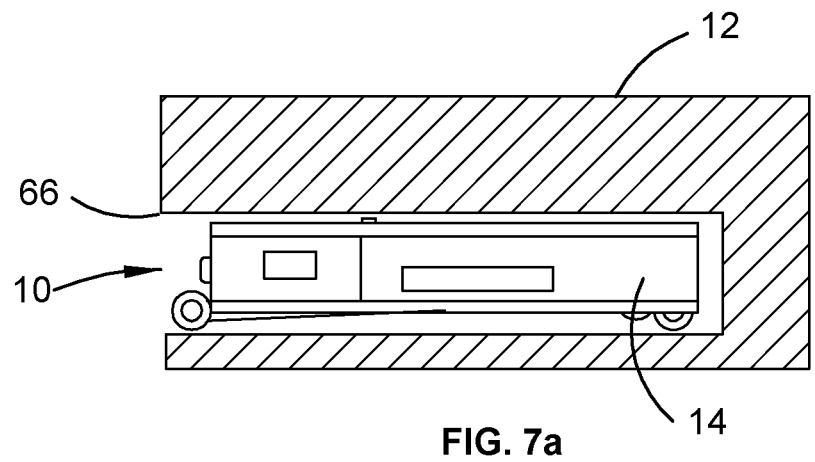
FIG. 7a is a side cross-sectional view of the slide out kitchen of FIG. 6 in a storage configuration.
Figure 7B:
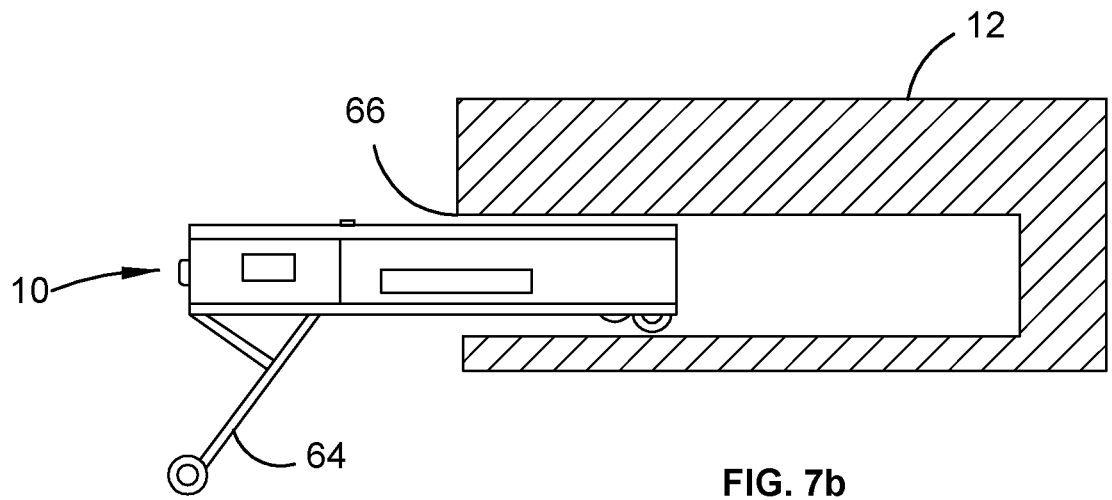
FIG. 7b is a side cross-sectional view of the slide out kitchen of FIG. 6 in a partly withdrawn configuration.
Figure 7C:
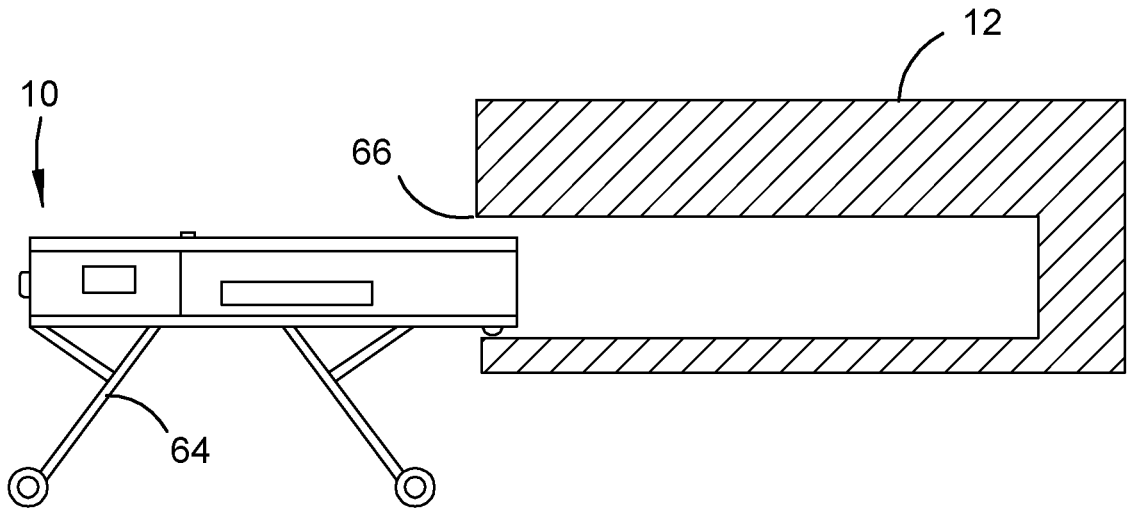
FIG. 7c is a side cross-sectional view of the slide out kitchen of FIG. 6 in a withdrawn configuration.

In FIG. 7a, the kitchen 10 is in the storage configuration fully stored within a receptacle 66 in the vehicle 12. In FIG. 7b, the kitchen is partly withdrawn from the vehicle such that the front portion of the collapsible trolley legs 64 falls to rest on the floor surface to partly support the kitchen. In FIG. 7c, the kitchen is fully the withdrawn from the vehicle thereby fully releasing the trolley legs to contact the ground surface.

It should be understood that the extension of the trolley legs will happen automatically as the kitchen is pulled out of its receptacle 66 in the vehicle. To stow the kitchen away, the procedure is reversed by the user simply pushing the kitchen into the receptacle 66 allowing the trolley legs to automatically collapse into the storage configuration. In this way, the collapsible trolley legs of the present invention operate in a similar way to the legs of an ambulance gurney.

Whilst the extension of the trolley legs will happen automatically, according to this embodiment, there will also be a provision to manually extend and retract the trolley legs between the extended and retracted configurations and further, to manually adjust the cabinet height to suit different requirements. In this respect, an advantage of this embodiment is that the height of the kitchen is adjustable to work with high floor vehicle or low floor vehicle. A further advantage is that the kitchen is transportable to a location not directly adjacent the vehicle such as at a campsite.

Figure 8A:
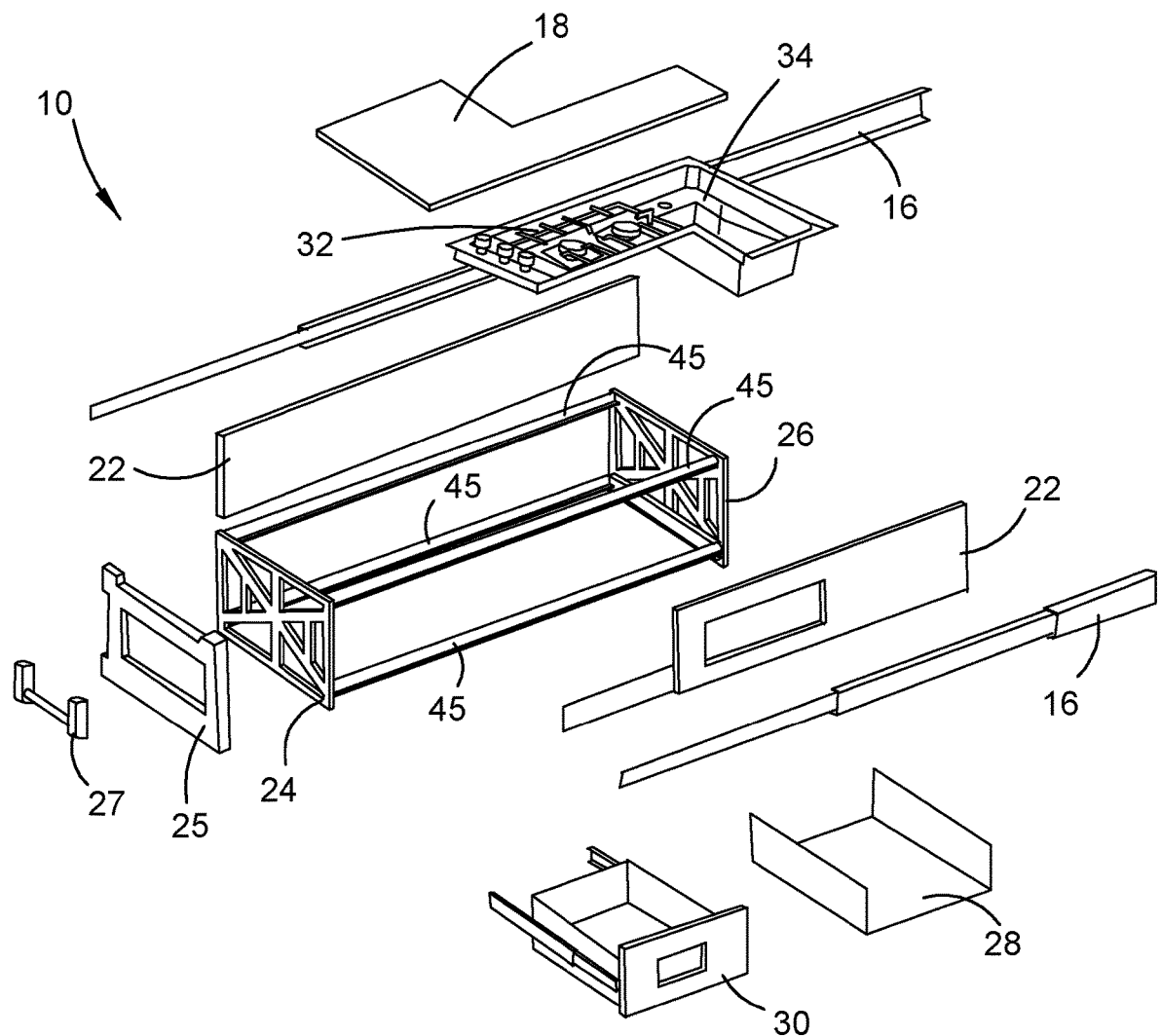
FIG. 8 is an exploded view of the slide out kitchen of FIG. 1 showing the modular components of its construction.
FIG. 8b is a sectional view of part of the kitchen of FIG. 1 through a corner support.
Figure 8B:
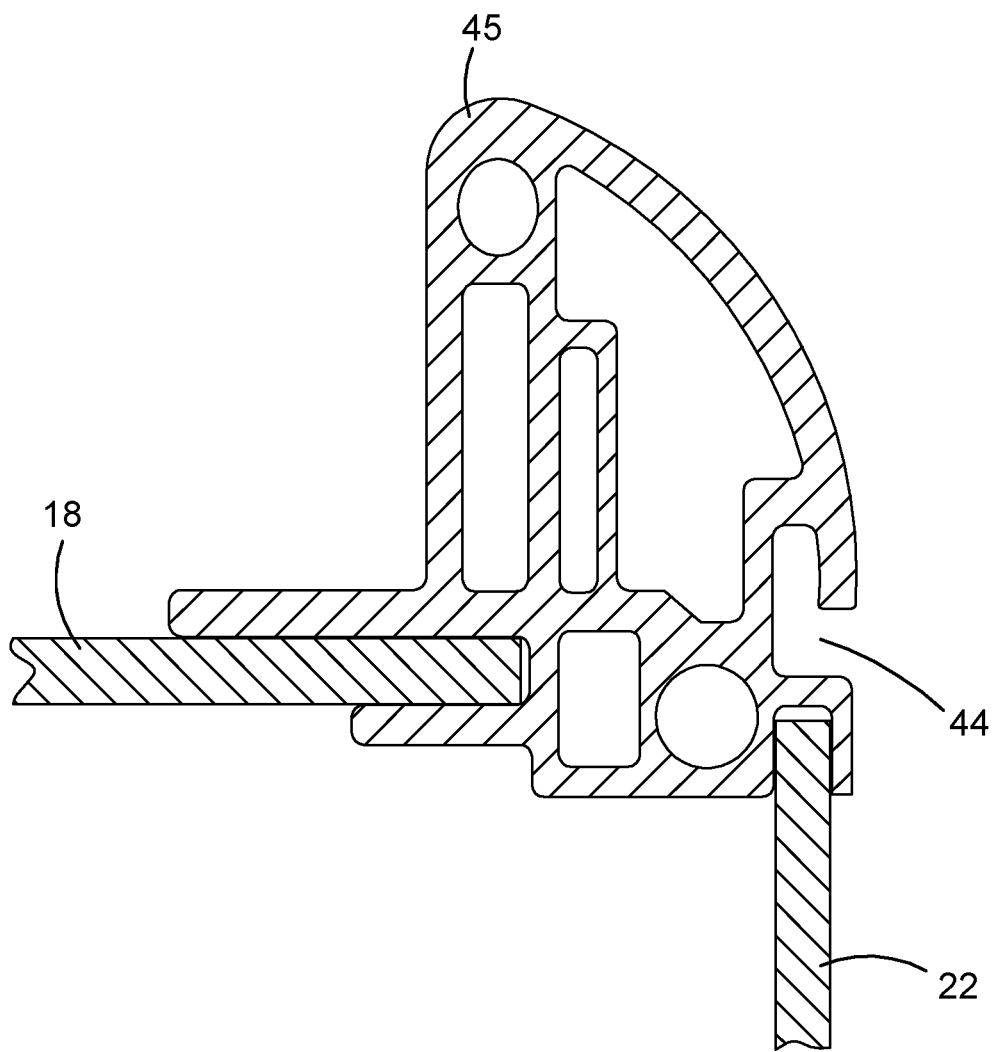

With reference to FIGS. 8a and 8b, in accordance with a further aspect, the slide out kitchen is designed to be lightweight, modular, corrosion free and easy to manufacture. For this reason, it is constructed from lightweight aluminium extruded profiles and composite panels. This differs significantly from prior art slide out kitchens, which are formed predominantly from stainless steel and, as a result, are significantly heavier than the kitchen of the present invention. Furthermore, stainless steel requires custom tool dies for stamping manufacture, which is a significant investment cost. Due to its lighter weight, the slide kitchen 10 is easier to pull-out of the vehicle, has minimal impact of the vehicle stability when in the extended or closed configurations.

In order for the kitchen construction to be modular, a predefined set of panels for the elongate top surface 18, and sides panels 22 and corresponding aluminium corner supports 45 are chosen based on the length of kitchen desired. The outer and inner end panels 24, 26 and remaining components are the same for all sized kitchens. As can be seen with reference to cross sectional drawing FIG. 8b, engagement between side panel 22, top surface panel 18 and corner support 45 is achieved by inserting the side panel and top surface panel into respective grooves in the corner support. It should be appreciated that as the corner supports are fixed in location due to engagement with the outer end 24 and inner end 26, no fasteners or other fixing means are required to retain the side panels and top surface panel in position in the corner support grooves. However, some form of sealing may be employed to minimise movement during use and potential moisture ingress.

Returning to FIG. 8*a*, the cooktop 32 and sink 34 are retained to the corner supports 45 in a similar way. Outer end 24 and inner end 26 are engaged with the corner supports 45 by way of screw fasteners which penetrate the ends of the corner supports. Similarly, cover piece 25, handle 27, rails 16, drawer 30 and storage area 28, are secured to the corner supports using screw fasteners as is common in the art. In this way, the production of the slide out kitchen is modular, using many standard parts making mass manufacture less expensive than other known methods and with much initial less investment cost. As mentioned, the length of the kitchen can be changed by selecting longer or shorter side panels and corner supports, with all the other components being common to all lengths.

Figure 9:
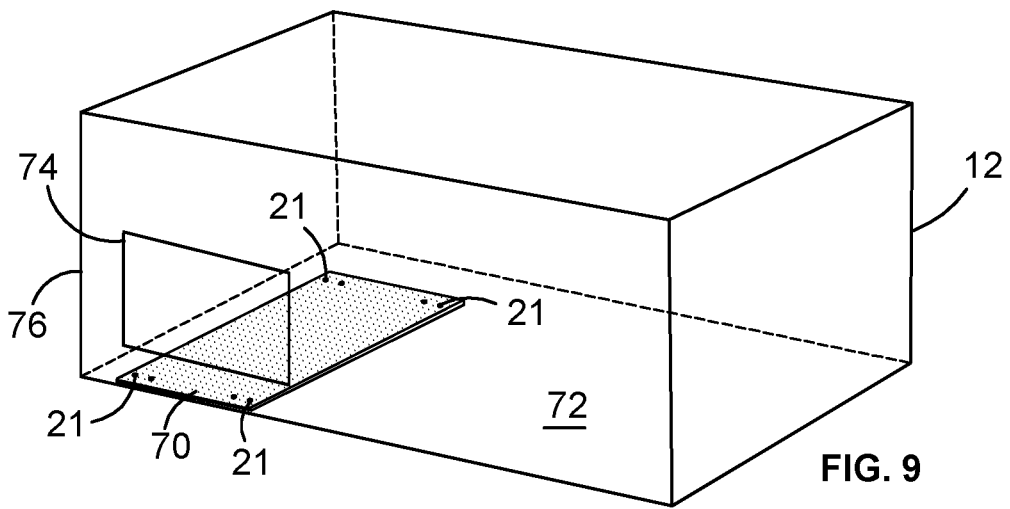
FIG. 9 is a schematic view of part of a vehicle showing the first step of installation of the slide out kitchen of FIG. 1.
Figure 10:
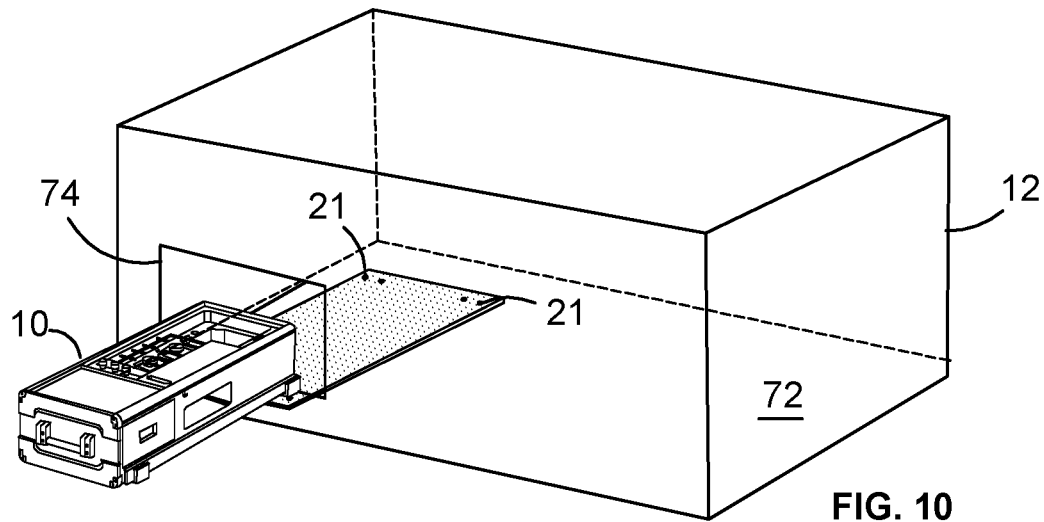
FIG. 10 is a schematic view of part of a vehicle showing a second step of installation of the slide out kitchen of FIG. 1.

Referring now to FIGS. 9 to 10, it can be seen how the slide out kitchen 10 of the first embodiment can be installed in a recreational vehicle 12 and ready for use. This method can be similarly used to install the slide out kitchen in a permanent structure such as an outdoor cabinet.

Figure 11:
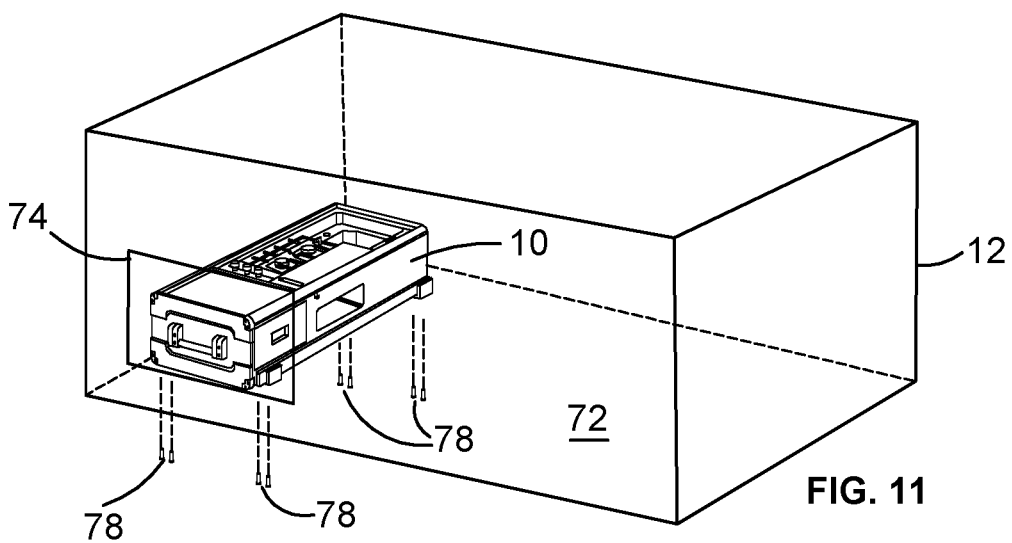
FIG. 11 is a schematic view of part of a vehicle showing a third step of installation of the slide out kitchen of FIG. 1.

In the first step shown in FIG. 9, a template 70 indicating the position of drill holes 21 is placed in position on the vehicle floor 72 proximate the access aperture 74. Importantly, the front of the template 70 must be in contact with the vehicle's wall 76 so that the drill holes are positioned correctly. Once the template 70 is in the correct position the holes in the vehicle floor can be drilled. As best shown in FIG. 10, the next step of the process is to place the kitchen 10 into position through access aperture 74. In the last step of the process shown in FIG. 11, the kitchen 10 is secured in position on the vehicle floor 72 using fasteners 78. Importantly, it should be appreciated that to allow for the fasteners to be secured from one side of the vehicle floor, it is proposed that self-clinching nuts (not shown) be used to secure the fasteners 78 so that an installer working from one side of the installed surface is all that is required. In this way, installation of the slide out kitchen 10 is less expensive and faster that when standard screw fasteners are used.

Returning to FIGS. 1 to 3, one installed, the slide out kitchen is pulled out by simply unlocking the access door 13 and pulling the kitchen 10 out using the supplied handle. The rails 16 allow the kitchen to automatically lock in the extended configuration so that it will remain in position during use. With the exception of safety gas valve release, the kitchen 10 should be ready to use once in the extended configuration, with all the plumbing and fittings are already connected using flexible connections. In the extended configuration, the kitchen components on the top surface may be arranged as desired, with each component having an assigned location. Further kitchen accessories may be engaged with the slot 44 as required, making use of the slide kitchen extremely efficient.

In the second embodiment, the slide out kitchen may be removable as shown in FIGS. 6*a* to 7*c* and positioned at an ideal height as well as positioned at a desired location. It will be appreciated that this application involves use of a movable water and gas supply.

The slide out kitchen may be formed from aluminium composite panels and aluminium extruded profiles making it much lighter than prior art slide out kitchens. This material further allows a modular construction, with many of the same components used on slide out kitchens with different lengths or surface configurations. Panels are easily joined using extrusion corner members and standard fasteners. In these respects, the labour cost required to manufacture the kitchen 10 is a lot less than using stainless steel or fibreglass.

The aluminium material is minimally impacted by use of the kitchen in corrosive environments such as proximity to salt water. Importantly, its lighter construction means it will have minimal impact on the vehicle's balance while moving, apply less force to the towing components, and have minimal effect on fuel consumption relative to prior art kitchens. In a housing installation, the slide out kitchen is easy to withdraw and pack away and will not corrode.

The accessory engagement means makes use of the slide out kitchen more convenient and will potentially reduce the loss of kitchen implements when in use in remote areas. Interchangeable kitchen components 38 are provided such that the user can reconfigure the top surface as required adding to the commercial appeal of the slide out kitchen.

It should be appreciated that in the above description of exemplary embodiments, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

While there has been described various embodiments, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A slide out kitchen including:
    an elongate cabinet adapted for moveable mounting to a structure between a closed configuration and an extended configuration, wherein said cabinet includes an elongate top panel, a pair of elongate side panels and at least one end panel and wherein said cabinet includes at least one corner support;
    at least one cooktop;
    an accessory engagement structure to secure kitchen accessories to said cabinet said accessory engagement structure being a at least one elongate slot; and,
    wherein said at least one elongate slot is disposed in said at least one corner support.

2. A slide out kitchen according to claim 1, wherein said elongate top panel, said pair of elongate side panels and said at least one corner support are selected from a set of panels and supports having predefined lengths.

3. A slide out kitchen according to claim 1, wherein one of said pair of elongate side panels and said elongate top panel are engaged with said at least one corner support.

4. A slide out kitchen according to claim 1, wherein said at least one corner support includes a pair of grooves for receiving one of said pair of elongate side panels and said elongate top panel.

5. A slide out kitchen according to claim 1, wherein said cabinet is formed from extruded aluminium members and aluminium composite panels.

6. A slide out kitchen according to claim 1, wherein said elongate top panel, said pair of elongate side panels and said at least one end panel are aluminium composite panels.

7. A slide out kitchen according to claim 1, wherein said at least one corner support is an aluminium extruded profile.

8. A slide out kitchen according to claim 1, wherein said at least one elongate slot is located adjacent one of said pair of elongate side panels of the cabinet.

9. A slide out kitchen according to claim 1, wherein said at least one elongate slot is adapted for engagement with one or more accessory brackets, said one or more accessory brackets having a slot engaging portion with a complementary profile to said at least one elongate slot.

10. A slide out kitchen according to claim 1, further comprising one or more interchangeable kitchen components.

11. A slide out kitchen according to claim 10, wherein said one or more interchangeable kitchen components include a chopping board, a barbeque lid, cast iron grille tray and a preparation tray.

12. A slide out kitchen according to claim 1, further including a sink.

13. A slide out kitchen according to claim 1, wherein said at least one cooktop is recessed into said elongate top panel such during use of said at least one cooktop, cooking flames from said at least one cooktop are minimally affected by wind gusts.

14. A slide out kitchen according to claim 12, wherein said sink is recessed into said elongate top panel.

15. A slide out kitchen according to claim 1 including a pair of telescoping rails for moveable mounting of said cabinet to said structure.

16. A slide out kitchen according to claim 1, wherein said cabinet is removable from said structure.

17. A slide out kitchen according to claim 16 including a retractable rolling platform for supporting said cabinet once removed from said structure.

18. A slide out kitchen according to claim 1 further comprising at least one storage drawer extending from one of said pair of elongate side panels.

19. A slide out kitchen according to claim 1, wherein upon reaching said closed configuration an at least one end is substantially flush with a side of said structure.

20. A slide out kitchen according to claim 15, wherein self-clinching nuts are used to secure said pair of telescoping rails to said structure.

21. A slide out kitchen according to claim 1, wherein said structure is part of a recreational vehicle.

\* \* \* \* \*